United States Patent
Delker et al.

(10) Patent No.: US 8,554,934 B1
(45) Date of Patent: *Oct. 8, 2013

(54) APPLICATION SINGLE SIGN ON LEVERAGING VIRTUAL LOCAL AREA NETWORK IDENTIFIER

(75) Inventors: Jason R. Delker, Olathe, KS (US); John M. Everson, Parker, CO (US); James W. Norris, Kansas City, MO (US); Carol A. Ross, Shawnee, KS (US); Jason K. Whitney, Lee's Summit, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/429,320

(22) Filed: Mar. 24, 2012

Related U.S. Application Data

(63) Continuation of application No. 12/502,227, filed on Jul. 13, 2009, now Pat. No. 8,195,819.

(51) Int. Cl.
G06F 15/16 (2006.01)
(52) U.S. Cl.
USPC .......................................................... 709/229
(58) Field of Classification Search
None
See application file for complete search history.

(56) References Cited

U.S. PATENT DOCUMENTS

| | | | |
|---|---|---|---|
| 8,195,819 B1* | 6/2012 | Delker et al. ................. | 709/229 |
| 2004/0255154 A1* | 12/2004 | Kwan et al. .................. | 713/201 |
| 2007/0250905 A1* | 10/2007 | Clark et al. ........................ | 726/1 |
| 2008/0069102 A1* | 3/2008 | Koehler et al. ............... | 370/392 |
| 2008/0285559 A1* | 11/2008 | Luo et al. ..................... | 370/390 |

* cited by examiner

*Primary Examiner* — Ryan Jakovac

(57) ABSTRACT

A processor-implemented method for providing application single sign on leveraging a virtual local area network identifier is provided. The method comprises an authentication server providing a client device access to a network via association with a virtual local area network and a credential. The method also comprises the device invoking an application hosted on an application server and the application server identifying a virtual local area network tag associated with the device. The method also comprises the application server sending a message to the authentication server requesting linkage of the tag with a user identification associated with the device. The method also comprises the authentication server linking the tag with the user identification associated with the device and sending a message to the application server containing the identification. The method also comprises the application server using the identification to authenticate the device with the application and the device receiving access.

15 Claims, 8 Drawing Sheets

FIG. 6
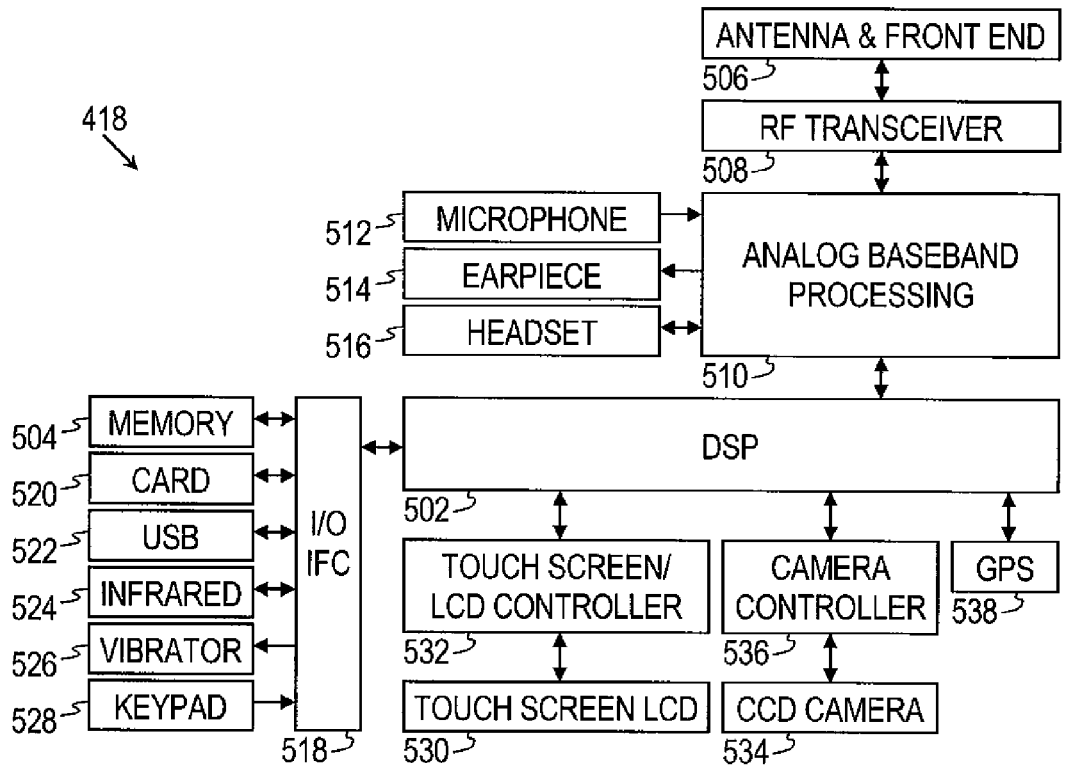
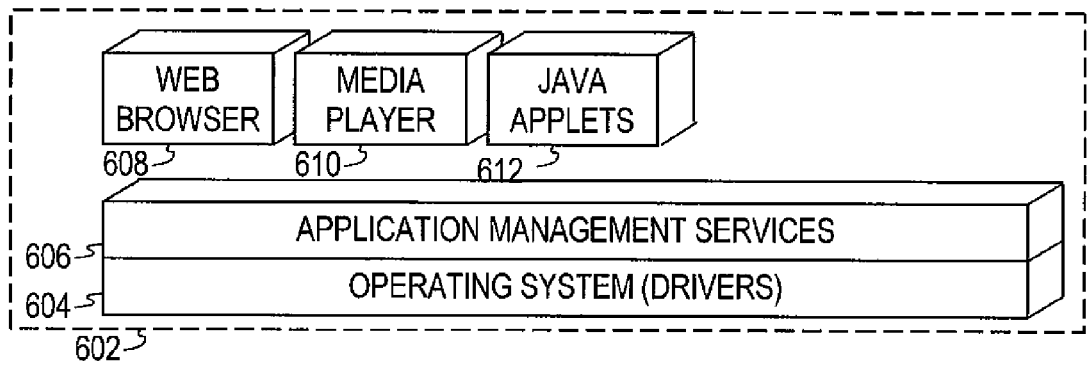
FIG. 7

APPLICATION SINGLE SIGN ON LEVERAGING VIRTUAL LOCAL AREA NETWORK IDENTIFIER

CROSS-REFERENCE TO RELATED APPLICATIONS

This application is a continuation of and claims priority to U.S. patent application Ser. No. 12/502,227, entitled "Application Single Sign On Leveraging Virtual local Area Network Identifier", filed on Jul. 13, 2009, which is incorporated herein by reference for all purposes.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A virtual local area network is a logical local area network that extends beyond a single traditional local area network to a group of local area network segments. A virtual local area network has the same attributes as a physical local area network, but it allows for end stations to be grouped together even if they are not located on the same physical network switch or segment. Because a virtual local area network is a logical entity, its creation and configuration is done in software instead of by physically relocating devices. Traditional network designs use routers to create broadcast domains and limit broadcasts between multiple subnets. Virtual local area network software permits the same broadcast domain to extend beyond a single segment and provides the segmentation services traditionally provided by routers in local area network configurations. Virtual local area networks may permit control of traffic patterns and more expedient reaction to device relocations. Virtual local area networks may also provide the flexibility to adapt to changes in network requirements and allow for simplified administration including relief from duties of managing resource permissions.

SUMMARY

In an embodiment, a processor-implemented method for providing an application single sign on leveraging a virtual local area network identifier is provided. The method comprises an authentication server providing a client device access to a network via association with a virtual local area network and a credential. The method also comprises the client device invoking an application hosted on an application server and the application server identifying a virtual local area network tag associated with the client device. The method also comprises the application server sending a first message to the authentication server requesting linkage of the virtual local area network tag with a user identification associated with the client device. The method also comprises the authentication server linking the virtual local area network tag with the user identification associated with the client device and sending a second message to the application server containing the user identification. The method also comprises the application server using the user identification to authenticate the client device with the application and the client device receiving access to the application.

In an embodiment, a processor-implemented method for providing an application single sign on leveraging a virtual local area network identifier is provided. The method comprises an authentication server providing a client device a first access to a network via association with a first virtual local area network and a first credential. The method also comprises the client device invoking an application hosted on an application server. The method also comprises the application server recognizing a first virtual local area network tag associated with the client device. The method also comprises the application server sending a first message to the authentication server requesting a user identification associated with the client device and requesting the first level of authentication associated with the first virtual local area network tag. The method also comprises the authentication server matching the first virtual local area network tag with the user identification associated with the client device and sending a second message to the application server containing the user identification and the first level of authentication associated with the first virtual local area network tag. The method also comprises the application server determining that the first level of authentication is insufficient to access the application and notifying the client device. The method also comprises the client device severing association with the first virtual local area network. The method also comprises the client device invoking the application after severing association with the first virtual local area network. The method also comprises the client device receiving a second access to the network via association with a second virtual local area network and a second credential. The method also comprises the application server recognizing a second virtual local area network tag associated with the client device. The method also comprises the application server sending a third message to the authentication server requesting a user identification associated with the client device and requesting the second level of authentication associated with the second virtual local area network tag. The method also comprises the authentication server matching the second virtual local area network tag with the user identification associated with the client device and sending a fourth message to the application server containing the user identification and the second level of authentication associated with the second virtual local area network tag. The method also comprises the application server using the user identification and the second level of authentication to authenticate the client device with the application and the client device receiving access to the application.

In an embodiment, a processor implemented method for providing an application single sign on leveraging a virtual local area network identifier. The method comprises an authentication server providing a client device access to a network via association with a virtual local area network and a credential. The method also comprises the client device invoking a first application hosted on an application server and the application server reading a virtual local area network tag associated with the client device. The method also comprises the application server sending a message to an authentication server requesting matching of the virtual local area network tag with a user identification associated with the client device and requesting an authentication code associated with the virtual local area network tag. The method also comprises the authentication server matching the virtual local area network tag with the user identification associated with the client device and the authentication code and sending a second message to the application server containing the user identification and the authentication code associated with the virtual local area network tag. The method also comprises the application server storing the authentication code and granting the client device access to the first application based on the authentication code. The method also comprises the client device invoking a second application. The method also comprises the application server consulting the stored authentication code and granting the client device access to the second application based on the authentication code.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

FIG. 6 is a block diagram of a mobile device according to an embodiment of the disclosure.

FIG. 7 is a block diagram of a software configuration for a mobile device according to an embodiment of the disclosure.

DETAILED DESCRIPTION

Figure 1:
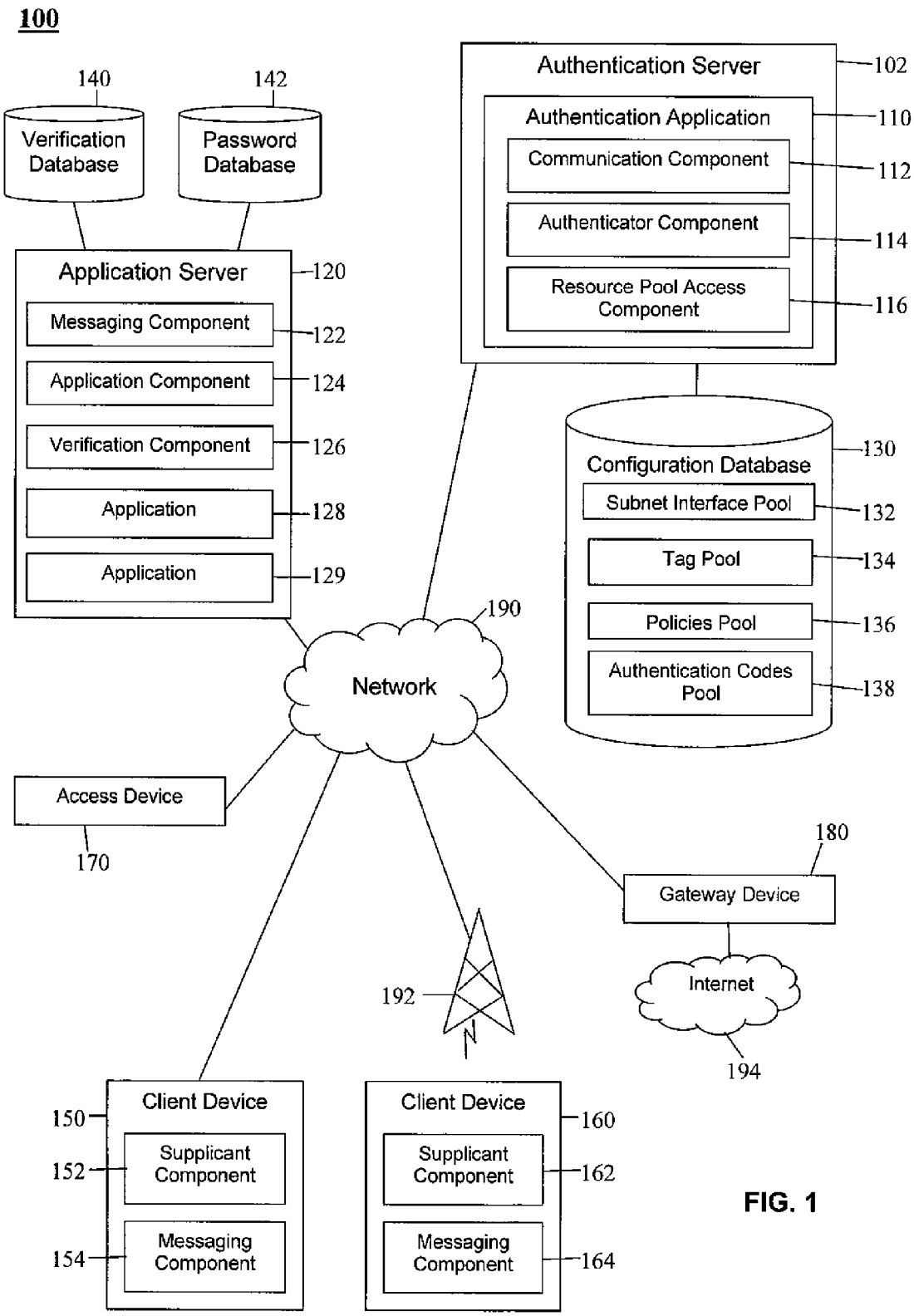
FIG. 1 is a block diagram of a system according to an embodiment of the disclosure.

It should be understood at the outset that although illustrative implementations of one or more embodiments are illustrated below, the disclosed systems and methods may be implemented using any number of techniques, whether currently known or in existence. The disclosure should in no way be limited to the illustrative implementations, drawings, and techniques illustrated below, but may be modified within the scope of the appended claims along with their full scope of equivalents.

The disclosure teaches an application single sign on leveraging a virtual local area network identifier to promote a client device that is associated with a dynamically configured virtual local area network to access applications without separately authenticating with each application. The initial authentication for association with a virtual local area network is used by the methods of application single sign on to relieve the client device of the task of entering user identification and password or other credential each time an application is invoked. Applications may be modified to accept the authentication performed to establish the virtual local area network. When a client device that has been authenticated and provided dynamic association with a unique virtual local area network attempts to access an application, an application server reads a virtual local area network tag associated with the client device. The application server then submits information about the virtual local area network tag to an authentication server that may have earlier instantiated the virtual local area network. The authentication server uses the virtual local area network tag to determine the user identification associated with the client device. The authentication server sends the user identification to the application server. The application server may verify the user identification and/or submit the user identification to the application which then starts and provides access to the client device. The entire process may be transparent to the client device.

The authentication server, in addition to determining the identity of the user associated with the client device and providing it to the application server, may also determine a level of authentication associated with the client device's virtual local area network association and may furnish that information to the application server. Client devices may use several methods to initially authenticate with an authentication server, achieving different levels of authentication and network access. The authentication server may communicate the authentication level obtained by the client device to the application server. The application server may use that authentication level along with the user identification to access the application for the client device. Applications that normally require unique user identifications and passwords or other credentials may be modified to trust virtual local area network authentication and permit access when the application server receives satisfactory user identification associated with the virtual local area network tag associated with the client device. The application server may alternatively access a secure database containing passwords corresponding to user identifications. Upon receiving a user identification associated with a virtual local area network tag, the application server may draw the corresponding password from the database and furnish it to the application along with the user identification, allowing the client device access to the application.

Some applications may require a level of authentication stronger than the authentication level attained by a client device when it instantiated its present virtual local area network association. If a client device presently associated with a virtual local area network that was established with a basic level of authentication attempts to access such an application that requires a higher level of authentication, the client device may be required to terminate its virtual local area network association and authenticate again with an authentication server using a stronger authentication method that will allow the client device access to the desired application. The present disclosure teaches a method for a client device associated with a virtual local area network tag provided a level or type of authentication lower or different than that required by an application to sever its association with its virtual local area network, authenticate again using a different method, be associated with a newly instantiated virtual local area network, and receive access to the application.

Each time a client device receives dynamic association with a virtual local area network, it may be associated with a uniquely instantiated virtual local area network tag. The authentication server that provided the client device the association with the virtual local area network records the authentication method used by the client device and stores the information with the identification of the associated user, the virtual local area network tag, and other information associated with the client device's unique virtual local area network. When a client device attempts to access an application, the application server parses the client device's access attempt and analyzes the virtual local area network tag associated with the client device. The application server requests from the authentication server the user identification associated with the client device. The application server also requests the authentication level associated with the client device. If the authentication level is not adequate for the client device to receive access to the application, the client device may authenticate again with the authentication server using a more secure credential or method of authentication and receive access to the application.

The present disclosure also teaches the use of dynamically created virtual local area networks to provide authenticated access to a suite of applications based on a single sign on. Upon receipt of a message from the application server containing virtual local area network tag information, the authentication server may examine the virtual local area network tag and locate an authentication code based on the method or combination of methods of authentication used by the client device. The authentication server sends the user identification and authentication code to the application server. The application server may consult a database associating authentication codes, user identifications, applications, and access levels. The information in this database may be updated regularly by changes made to the authentication codes. Authentication codes may be limited to indicating a certain level of access to certain applications or they may be specific to client devices, user identifications, and access to certain applications. The authentication code allows a client device specific levels of access to certain specific applications while associated with a dynamically instantiated virtual local area network. Client devices authenticate once and receive access to a plurality of applications that would otherwise require their own sign on credentials. The application server may contact the authentication server only one time instead of every time the client device attempts to start a new application. This simplifies the process for the user of the client device, eases processing load on the application server and authentication server, and reduces network traffic between the two servers.

Turning now to FIG. 1, a system 100 for an application single sign on leveraging virtual local area network identifier is provided. The system 100 comprises an authentication server 102, an authentication application 110, an application server 120, an application 128, a configuration database 130, a verification database 140, a password database 142, a client device 150, an access device 170, a gateway device 180, a network 190, and a wireless base transceiver station 192. In some embodiments, additional client devices 160 and additional applications 129 will be present and active in the system 100. Attributes and functionality described with reference to the client device 150 are representative of the attributes and functionality of the additional client devices 160. Attributes and functionality described with reference to the application 128 are representative of the attributes and functionality of the additional applications 129.

The authentication server 102 may be any general purpose computer system, as discussed in greater detail hereinafter. The authentication server 102 may comprise one computer or a plurality of computers, for example a server farm wherein many server computers cooperate to share a processing load. The authentication server 102 may comprise a plurality of computers that are located at different places, for example to provide geographical diversity and increased service reliability. The authentication server 102 executes one or more applications that provide services to at least one of the client devices 150 including hosting of the authentication application 110.

The authentication application 110 executes on the authentication server 102 and receives messages from the access device 170 containing requests from the client device 150 for authentication and access to network services. The authentication application 110 consults network policies and determines whether the client device 150 should be associated with a virtual local area network while being granted access to services on an enterprise or other network serving multiple client devices 150, 160. When the client device 150 initially seeks access to services on a network it initiates the process by contacting an access device 170, for example an Ethernet switch. Some client devices 150, 160 may be provided access to some network services without the need to be associated with a virtual local area network. Other client devices 150, 160 may be of a device type or seek to access services of a type such that a network policy prescribes the client devices 150, 160 to be associated with a virtual local area network exclusive to the client device 150, 160. When such a network policy is in effect, the authentication application 110 instantiates a virtual local area network for exclusive association with the client device 150 and associates the client device 150 and network policy with the new virtual local area network.

The authentication application 110 also receives messages from the application server 120 containing requests to provide user identifications and other information associated with a virtual local area network tag read by the application server 120. When a client device 150 that is associated with a virtual local area network seeks to invoke a service provided by the application 128, the application server 120 receives a message from the client device 150 that may include the virtual local area network tag associated with the client device 150. The application server 120 sends a message to the authentication application 110 containing information about the virtual local area network tag with a request to identify the user associated with the virtual local area network tag and client device 150. The authentication application 110 consults the configuration database 130 for the identity of the user associated with the client device 150 and virtual local area network tag and communicates the information back to the application server 120. The authentication application 110 also may include in the communications back to the application server 120 information about the method of authentication used by the client device 150 when the virtual local area network with which the client device 150 is associated was established. In embodiments wherein dynamically configured virtual local area networks are being used, network traffic may be associated with virtual local area network tags.

The authentication application 110 comprises the communications component 112 that communicates with the access device 170 when the client device 150, 160 first requests a service that depends upon association of the client device 150, 160 with a virtual local area network to receive the requested service. The communications component 112 receives messages from the access device 170 containing requests originated by client devices 150, 160 for access to network services. The communications component 112 sends virtual local area network configuration information to the access device 170, the gateway device 180, and the application server 120 when it has been determined that a policy prescribes a virtual local area network to be created for the client device 150, 160. The communications component 112 sends internet protocol interface information and a virtual local area network tag to the access device 170, the gateway device 180, and the application server 120 with instructions to provision virtual local area network interfaces on physical interfaces on each device to instantiate the virtual local area network for the client device 150. In an embodiment, the gateway device 180 may function as an intermediary between the client device 150 and the application server 120. The communications component 112 also exchanges messaging with the access device 170, the gateway device 180, and the application server 120 about the maintenance and tear down of virtual local area networks and the recovery of virtual local area network tags and subnet interface configuration information after tear down. The authentication application 110 controls the creation and provisioning as well as attending to the orderly dismantling of virtual local area networks. The communications component 112 handles the movement of provisioning information, instructions, and other messaging associated with virtual local area networks.

The communications component 112 also processes the messaging between the authentication application 110 and the application server 120 when a client device 150 accesses the application 128. The communications component 112 receives the initial message from the application server 120 identifying the virtual local area network tag associated with the client device 150 and requesting identification of the user associated with the client device 150. After the authentication application 110 consults the configuration database 130 containing information about the user and client device 150 associated with the virtual local area network tag, the communications component 112 sends a reply back to the application server 120. The authentication application 110 and the application server 120 may exchange several messages in connection with a client device 150 attempting to access the application 128, particularly when there may be an issue regarding the level of authentication currently in effect for the client device 150 in its association with its virtual local area network and the level of authentication needed by the specific application 128 that the client device 150 is seeking to access.

The authentication application 110 also comprises the authenticator component 114 that authenticates client devices 150 seeking to access network services. The authenticator component 114 receives the initial request for services from the access device 170 on behalf of the client device 150. The authenticator component 114 examines the services request and determines if a policy is currently in place for the client device 150, the network services requested, a combination thereof, or any other aspect of the request. If such a policy is in place, the authenticator component 114 reviews the policy and determines if the policy allows the client device 150 to be associated with a virtual local area network. In the event such a policy is in place and authenticator component 114 determines that the client device 150 should be associated with a virtual local area network, the authenticator component 114 may then complete the steps of port-based authentication as described in standard 802.1x issued by the Institute of Electrical and Electronics Engineers (IEEE). Port-based authentication may be a step toward associating the client device 150 with a virtual local area network. After the authenticator component 114 completes port-based authentication of the client device 150 and any other steps toward authenticating the client device 150 for access to services, it may contact the communications component 112 with the request to generate configuration information and send the configuration information to the access device 170, gateway device 180, and the application server 120 to provision the virtual local area network for the client device 150.

The authentication application 110 also comprises the resource pool access component 116 that interacts with the configuration database 130 to obtain configuration and policies information to provision virtual local area networks as well as take delivery of recovered configuration information after virtual local area networks have been torn down. The resource pool access component 116 is called upon by the authenticator component 114 to locate any applicable policies when the client device 150 is seeking access to services on a network including access to the application 128. The resource pool access component 116 is then called upon by the authentication application 110 after it has authenticated the client device 150 to draw internet protocol interface information and virtual local area network tag information from the configuration database 130 to provision the virtual local area network used to provide the client device 150 access to the network.

After a client device 150 has been authenticated and associated with a newly instantiated virtual local area network, the resource pool access component 116 may also draw information from the configuration database 130 about the authentication method used by the client device 150. This action may be caused by the authentication application 110 receiving a request from the application server 120 for user identification and other information arising from a client device 150 attempting to access the application 128. This information drawn from the configuration database 130 may comprise an authentication level or authentication code that when sent to the application server 120 may be read and understood by the application server 120 to represent levels of authentication for the applications 128, 129 that the client device 150 is attempting to access or may attempt to access during the current virtual local area network session.

The application server 120 provides access to applications 128, 129 for client devices 150, 160 associated with virtual local area networks. The application server 120 promotes the applications 128, 129 that normally request a unique user identification and perhaps a password or other credential to rely on virtual local area network tags and their supporting authentication and permit access to a client device 150. The application server 120 hosts the applications 128, 129 and provides security by verifying user identification and authentication with the authentication application 110. The application server 120 comprises a messaging component 122 that receives messages from client device 150, 160 that seek to access the applications 128, 129. The messaging component 122 recognizes when client devices 150, 160 are associated with virtual local area networks because messages from client devices 150, 160 may contain virtual local area network tags. The messaging component 122 determines when a virtual local area network tag included with an application request from a client device 150, 160 is associated with a dynamically configured virtual local area network exclusive to that client device 150, 160 only. The presence of this type of virtual local area network tag is an indication to the application server 120 that it may contact the authentication server 102, request the user identification and authentication level associated with the client device 150, and upon receipt of this information, provide the client device 150 access to the requested application 128, 129.

In an embodiment, it may not be mandatory that a virtual local area network tag be associated exclusively with a single client device 150 in order for the client device 150 to be provided access to a requested application 128, 129. More than one client device 150 may be associated with a specific virtual local area network that persistently provides access to a requested application 128, 129. In an embodiment, several client devices 150, 160 may simultaneously or at differing times access a specific virtual local area network that is dedicated to providing access to a specific application 128. A virtual local area network may be role-based and may be accessed by client devices 150, 160 seeking to perform specific tasks that may require access to one or more applications 128, 129.

The messaging component 122 of the application server 120 sends a message to the authentication application 110, the message containing the identity of the virtual local area network tag associated with a client device 150. The message requests that the identity of the user associated with the client device 150 be provided by the authentication application 110 as well as any information about the level of authentication used by the client device 150 when it was associated with its virtual local area network. Multiple messages may be exchanged between the application server 120 and the authentication application 110 if the level of authentication currently in effect for the client device 150 is inadequate for the application 128, 129 requested by the client device. For example, the client device 150 may have authenticated using a password but is requesting access to an application 128, 129 with a higher security level that requests a digitally-signed certificate for entry. The messaging component 122 and the communications component 112 of the authentication application 110 will exchange messaging about this disparity and the need for the client device 150 to furnish the more secure means of authentication.

The messaging component 122 of the application server 120, in addition to receiving the original request from the client device 150 for access to the application 128, 129, also conducts messaging with the client device 150 when the client device 150 needs to provide the higher level of authentication as described. This messaging may include advice to the client device 150 that it terminate its association with its current virtual local area network and re-authenticate with the authentication application 110 using the stronger credential required by the application 128, 129. In an embodiment, the messaging component 122 may use at least one of short message service (SMS), multimedia messaging service (MMS), message queue (MQ), electronic mail, service message blocks (SMB), and other electronic communications methods and protocols to exchange messages with the other components of the system 100.

The application server 120 also comprises the application component 124 that communicates with applications 128, 129 when a client device 150 seeks access. Some applications 128, 129 may require user identification only, and other applications 128, 129 may request user identification and some level of authentication. The application component 124 interacts with the applications 128, 129 in determining what each application 128, 129 requests to grant access to the client device 150. The applications 128, 129 are accessed by client devices 150, 160. While the applications 128, 129 may be depicted as contained by the application server 120, portions of applications 128, 129 may reside on servers or other components elsewhere in the system 100. In an embodiment, a client or requester component of the application 128, 129 may reside on a client device 150, 160. Access to the applications 128, 129 may be monitored and regulated by the application server 120 when access is attempted by client devices 150, 160 that have been associated with virtual local area networks.

In an embodiment, the present disclosure may provide for the applications 128, 129 to be modified to trust the application component 124 when the application component 124 verifies the level of authentication provided by the client device 150. Whereas the application 128, 129 might normally request a certain level of authentication to grant access to their services, in an embodiment, the applications 128, 129 may be modified to permit access when the application component 124 determines that the virtual local area network tag provided by the client device 150 has been linked with a user identification and authentication level satisfactory to the application 128 being accessed. The applications 128, 129 may in effect be modified to trust the determination made by the application server 120 through its interaction with the authentication application 110 that the client device 150 has achieved the level of authentication required by the applications 128, 129 for access.

In an embodiment, some of the applications 128, 129 may not be modified as previously described and instead may be provided the user identification and required password by the application component 124 as if the client device 150 was providing it directly. In this embodiment, these applications 128, 129 may not be "aware" of the actions of the components of the present disclosure. The extent of their interaction with the components of the present disclosure is to receive the user identification and authentication from the application component 124 that they request for access and then grant access to the client device 150.

The application server 120 also comprises a verification component 126 that may function with some embodiments of the present disclosure wherein a client device 150 is to be provided access to a plurality or suite of the applications 128, 129 that may specify a variety of levels or types of authentication for access. When initially authenticating and receiving association with a virtual local area network, a client device 150 may provide one or more credentials, such as a password, secure token, or digitally signed certificate. The authentication application 110 may record and store the identity of the client device 150, the identity of the user associated with the client device 150, the authentication credential(s) provided by the client device 150, the virtual local area network tag provided to the client device 150, and other information associated with the virtual local area network such as internet protocol subnet information and relevant policies. The authentication application 110 may generate an authentication code representing some or all of this information and send the authentication code to the application server 120. The application server 120 may separately maintain a verification database 140 listing the applications 128, 129 that are accessible for certain authentication codes provided by the authentication application 110. The verification component 126 uses the authentication code in the verification database 140 to determine the applications 128, 129 available to the client device 150. This process permits the client device 150 to be allowed access to more than one application 128, 129 at a time and alleviates the application server 120 of the burden of contacting the authentication application 110 every time the client device 150 seeks to access an additional application 128, 129. The verification component 126 verifies or ascertains what applications 128, 129 the client device 150 is to be permitted access given the authentication code provided by the authentication application 110.

The configuration database 130 is associated with the authentication server 102 and stores information used to instantiate virtual local area networks and associate authentication methods used by client devices 150 with authentication codes that may be used to provide client devices 150 access to the applications 128, 129. The configuration database 130 comprises the subnet interface pool 132 that contains information used to configure subnet interfaces on an access device 170, a gateway device 180, and an application server 120 to provision the virtual local area network for a client device 150. Information associated with configuring a subnet interface comprises an internet protocol address, an internet protocol subnet mask, an internet protocol default gateway, a domain name system (DNS) server, and a dynamic host control protocol (DHCP) server. The configuration database 130 also comprises the tag pool 134 that contains virtual local area network tags that are assigned to virtual local area networks dynamically instantiated for client device 150. Virtual local area network tags may be sectioned into sub-pools with some groups of virtual local area network tags reserved for use only by individual client devices 150. Virtual local area network tags of this type would be recognizable by the application server 120 when a client device 150 seeks to access the application 128, 129. Virtual local area network tags may in some embodiments alternatively be referred to as 802.1Q tags.

The configuration database 130 also comprises the policies pool 136. Policies are guidelines associated with client devices 150, users, groups, and/or resources on a network, for example, physical ports on a gateway device 180 that permit access to resources external to the system 100. The authenticator component 114 of the authentication application 110 may determine that a policy found in the policies pool 136 applies to a client device 150, a port on a gateway device 180, or some other resource that requires the client device 150 to be associated with a virtual local area network before being allowed access to resources on an enterprise or other network. In an embodiment, no policy may be found and a client device 150 may be permitted access to resources on a network without the need for a client device 150 to be associated with a virtual local area network.

The configuration database 130 also comprises an authentication codes pool 138 that contains associations of authentication codes with authentication methods. An authentication code may represent an authentication method or combination of authentication methods used by a client device 150. When the authentication application 110 receives a message from the application server 120 containing a request for a user identification and authentication level associated with virtual local area network tag provided by a client device 150, the authentication application 110 may reply back with the user identification and authentication type provided or it may instead reply back with the user identification and authentication code. The authentication code may be regarded as a shorthand version or codified indication of the at least one authentication method used by a client device 150. The authentication codes pool 138 associates authentication codes with individual authentication methods that a client device 150 may use and combinations of authentications that may be used. The verification component 126 of the application server 120 receives and understands authentication codes and uses authentication codes with the verification database 140 to determine to which of the applications 128, 129 the client device 150 may be granted access, given the authentication code provided by the authentication application 110. One authentication code, for example, may indicate that a password was used, a second authentication code may indicate that a digitally signed certificate was used, and a third authentication code may indicate that both a password and a digitally signed certificate had been furnished by the client device 150. Additional authentication codes may indicate that yet other authentication methods or combinations thereof were used. Authentication codes represent strength, quality, or type of authentication provided by a client device 150 and are relied upon by the application server 120 when consulting the verification database 140 to determine the applications 128, 129 to which the client device 150 may be granted access.

The verification database 140 is associated with the application server 120 and contains associations of authentication codes and authentication methods with the applications 128, 129 that a client device 150 may access. The verification database 140 is consulted by the verification component 126 of the application server 120 when the authentication application 110 replies back with a user identification and an authentication code or authentication method associated with a client device 150. The verification component 126 uses the user identification and either the authentication code or authentication method to enter the verification database 140 and determine the applications 128, 129 that the client device 150 may access during its current virtual local area network association. The application server 120 may periodically modify the verification database 140 as the applications 128, 129 and their security policies change and as user accounts and their permitted accesses change.

The password database 142 contains associations of user identifications, the applications 128, 129, and passwords or other credentials that may permit users access to applications 128, 129. While much of the discussion of the present disclosure has involved the applications 128, 129 trusting the application server 120 to determine the authentication level of a client device 150 and in effect reuse the authentication procedures enforced by the applications 128, 129, in some embodiments, the actual furnishing of the required password or other credential by the application server 120 to the application 128, 129 may instead take place. This alternative embodiment may be less secure, because sending passwords across a network presents security risks as does the storage of passwords in a single location, such as in the password database 142. While this may not be the preferred embodiment, it may still be used given the structure or security requirements of a specific application 128, 129 and is hence taught by the present disclosure.

The client device 150, 160 is the component that seeks to access network services and may be associated with a virtual local area network. When the client device 150, 160 is associated with a dynamically configured virtual local area network instantiated exclusively for that client device 150, 160 and the client device 150, 160 then seeks to access the applications 128, 129 that are supported by the components and functionality of the present disclosure, the client device 150, 160 may be relieved of the task of providing user identification and authentication for each application 128, 129. This may provide convenience and improved productivity to parties using the client devices 150, 160.

The client device 150, 160 may be one of a mobile telephone, media player, personal digital assistant (PDA), laptop computer, tablet computer, desktop computer, set-top box, Voice over Internet Protocol (VoIP) desk set, printer, data appliance, camera, webcam, femtocell, and video device enabled to use the Internet Protocol. The client device 150, 160 comprises a supplicant component 152, 162 that makes initial contact with the access device 170 when the client device 150, 160 first seeks access to an enterprise or other network and may require association with a virtual local area network. The client device 150, 160 also comprises a messaging component 154, 164 that conducts messaging with the other components of the system 100 after the client device 150, 160 has been authenticated by the authentication server 102 and provided association with a virtual local area network.

The access device 170 receives the initial request to access an enterprise or other network from the client device 150, 160 and forwards the request to the authentication server 102. When the authenticator component 114 of the authentication application 110 determines by locating a policy or other method that the client device 150, 160 must be associated with a virtual local area network for the client device 150, 160 to be provided access to services, the authentication application 110 will draw configuration information from the subnet interface pool 132 and the tag pool 134 and send the configuration information to the access device 170 to provision a virtual local area network interface on the access device 170.

The access device 170 may be one or more physical devices that have similar functionality and perform substantially the same tasks in connection with the system 100. The access device 170 may be an Ethernet switch, WiFi access point, edge switch, other wireless access point, or other device with the capability to control physical access to a network based on the authentication status of the client device 150, 160. In an embodiment, the system 100 may comprise more than one access device 170.

The gateway device 180 is a router or other edge device that provides connection to the Internet 194 or other resources external to the system 100 through a secure network port or ports. When a client device 150, 160 is to be associated with a virtual local area network, the authentication application 110 may draw configuration information from the subnet interface pool 132 and the tag pool 134 and send the configuration information to the gateway device 180 to provision a virtual local area network interface on the gateway device 180 in a manner similar to its provisioning a virtual local area network interface on the access device 170 as described previously.

The network 190 promotes communications between the components of the system 100. The network 190 may be any communications network including a public data network (PDN), a public switched telephone network (PSTN), a private network, and/or a combination thereof.

The base transceiver station 192 may be any of a mobile telephone wireless base station, for example a Code Division Multiple Access (CDMA), Global System for Mobile Communications (GSM), and/or Universal Mobile Communications System (UMTS) mobile telephone wireless base station; a World-wide Interoperable Microwave Access (WiMAX) base station; a WiFi access point; or other wireless access device.

The Internet 194 is a worldwide, publicly accessible series of interconnected computer networks that transmit data by packet switching using the standard internet protocol (IP). In an embodiment, the Internet 194 may be any network external to the network 190 to which the client device 150, 160 wishes to connect using its virtual local area network.

Figure 2:
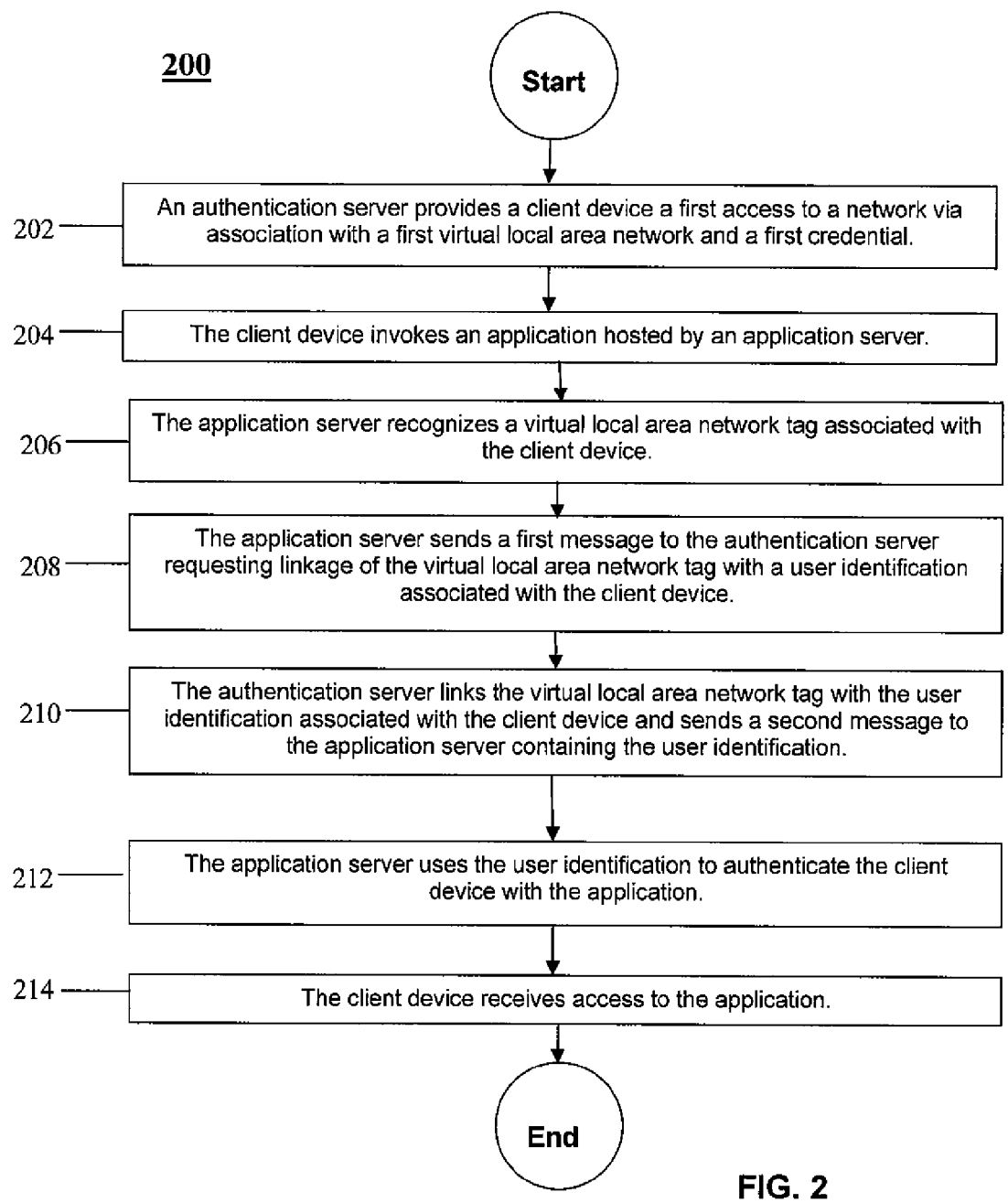
FIG. 2 is a flow chart illustrating a method according to an embodiment of the disclosure.

Turning now to FIG. 2, a method 200 is provided for a processor-implemented method for providing an application single sign on leveraging a virtual local area network identifier. Beginning at block 202, the authentication server 102, through the operation of the authentication application 110, provides a client device 150 access to an enterprise or other network by associating the client device 150 with a virtual local area network. The client device 150 may have attempted to access a service on the network that is accessible through the access device 170. The access device 170 relays the request to the authenticator component 114 of the authentication application 110. The authenticator component 114 examines the policies pool 136 of the configuration database 130 to determine if a policy in place prescribes that the client device 150 be associated with a virtual local area network. In the method 200, the authenticator component 114 determines that the client device 150 needs to be associated with a dynamically provisioned virtual local area network and should be the only client device 150 associated with the new virtual local area network. The supplicant component 152 of the client device 150 and the authenticator component 114 exchange messages that assist in the creation of the virtual local area network that includes port-based authentication. Port-based authentication is described in standard 802.1x issued by the Institute of Electrical and Electronics Engineers (IEEE) and is well known to those skilled in the art.

Continuing at block 202, the authentication application 110 provisions interfaces on the access device 170, the gateway device 180, and the application server 120 to instantiate the virtual local area network for the client device 150. The authentication application 110 draws provisioning information from the subnet interface pool 132 and the tag pool 134 and sends it to the access device 170, the gateway device 180, and the application server 120 for provisioning of subnet interfaces on the devices. In authenticating with the authentication application 110, the client device 150 may have provided credentials including a password, a media access control (MAC) address, a secure token, a device identity certificate that is compliant with the X.509 standard of the International Telecommunications Union (ITU) Telecommunications Standardization Sector (TSS) for public key infrastructure and Privilege Management Infrastructure, for example an x.509c3 certificate, or other authentication. The client device 150 may provide a combination of these credentials. The authentication application 110 records the method or methods of authentication used by the client device 150, because this information may be useful later.

At block 204, the client device 128 invokes the application 128. In some cases, the events occurring at block 204 and block 202 may occur at about the same time, such that a client device 150 that is not admitted to the enterprise or other network from which the application 128 is accessible clicks on or otherwise attempts to start the application 128. This action causes the actions described at block 202 to take place, wherein the client device 150 is associated with a virtual local area network.

At block 206, the messaging component 122 of the application server 120 receives a message that the client device 150 is attempting to start the application 128. The message contains information about the virtual local area network tag associated with the client device 150. The messaging component 122 recognizes that the virtual local area network tag is of a type designated for dynamically created virtual local area networks assigned to only one client device 150 at a time. The messaging component 122 recognizes that this request for access to the application 128 may be satisfied by invoking the functionality provided by the components of the present disclosure and the client device 150 may not have to enter a user identification and authentication to gain access to the application 128.

At block 208, the messaging component 122 sends a first message to the authentication application 110 requesting the user identification associated with the client device 150. The first message contains information identifying the virtual local area network tag provided by the client device 150. At block 208, the messaging component 122 requests the authentication application 110 to check its records and use the virtual local area network tag to locate the name of the user associated with the client device 150.

At block 210, the authentication application 110 links the virtual local area network tag identified by the messaging component 122 with the user identification associated with the client device 150 and sends the user identification to the messaging component 122 of the application server 120. The authentication application 110 may also check its records to determine the authentication method used by the client device 150 when its virtual local area network was instantiated and furnish this information to the messaging component 122 along with the user identification.

At block 212, the messaging component 122 provides the user identification to the application component 124 that may submit the user identification to the application 128 and starts the application 128. At block 214, the client device 150 begins receiving access to the application 128.

The application server 120 resolves discrepancies between user identifications in case a user provides one user identification while the client device 150 is being authenticated for association with its virtual local area network and the user is known to an application 128 by another user identification. The application server 120 may have access to a listing of user identifications used by various users and may draw upon the listing should discrepancies arise.

Figure 3A:
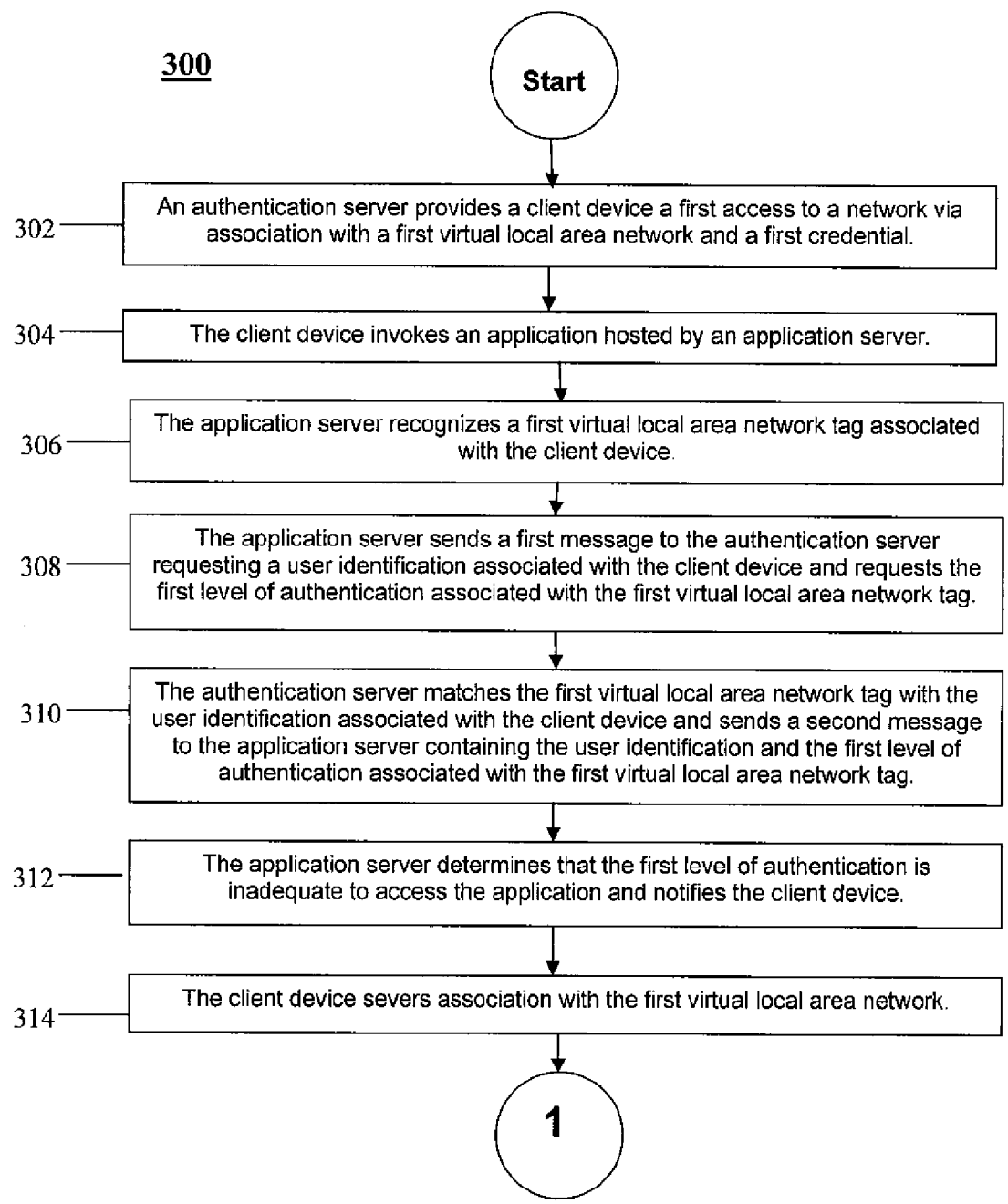
FIG. 3a and FIG. 3b are a flow chart illustrating another method according to an embodiment of the disclosure.
Figure 3B:
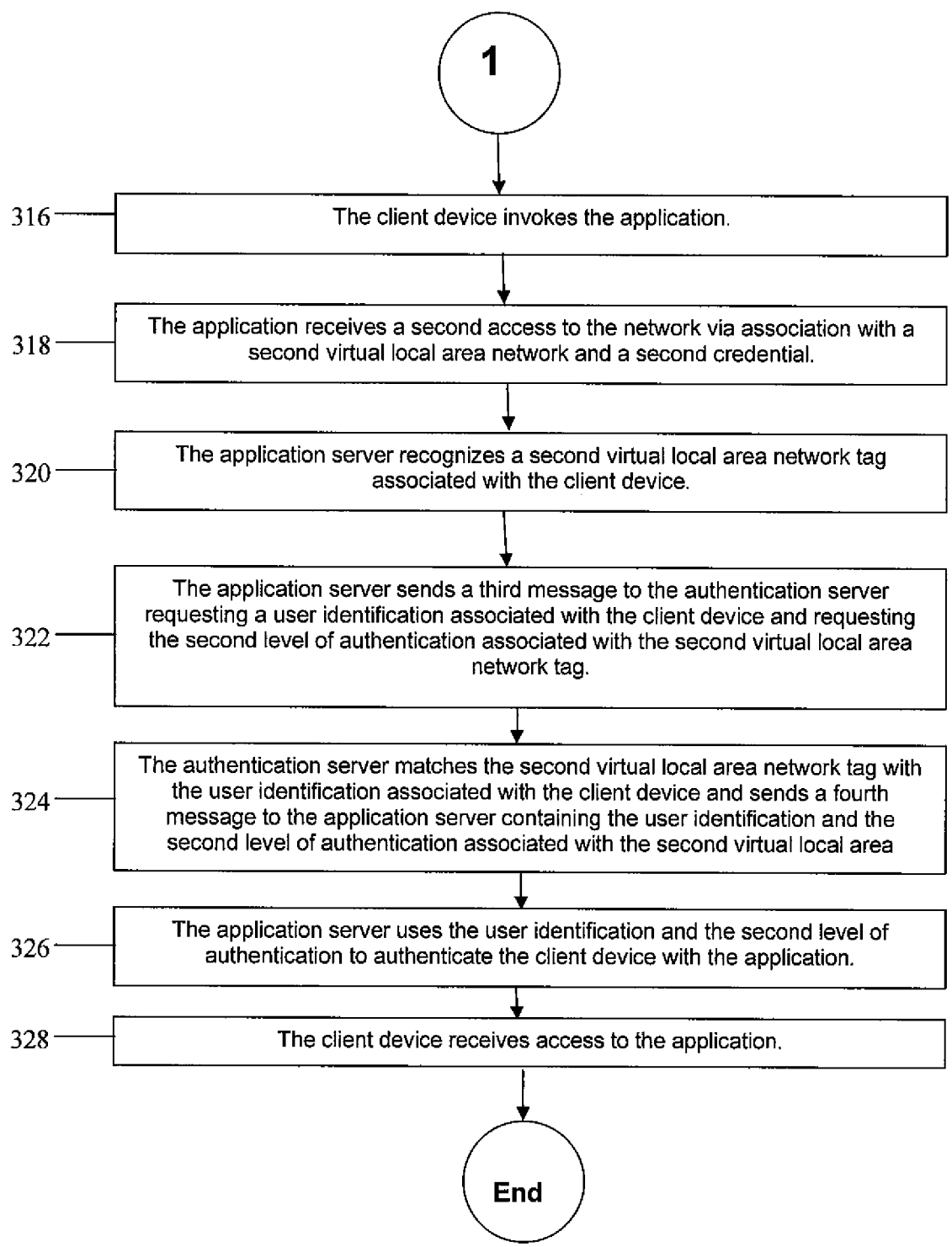

FIG. 3 discloses a processor-implemented method 300 for providing an application single sign on leveraging a virtual local area network identifier. The actions at blocks 302, 304, and 306 are substantially similar to the actions at blocks 202, 204, and 206 of the method 200. A client device 150 at block 302 is associated with a virtual local area network and at block 304 attempts to start an application 128. These actions result in the application server 120 at block 306 recognizing that the virtual local area network tag associated with the client device 150 indicates that the client device 150 may be relieved of the tasks of signing in and authenticating with the application 128.

At block 308, the messaging component 122 of the application server 120 sends a first message to the authentication application 110 containing information about the virtual local area network tag associated with the client device 150 and requesting that the authentication application 110 provide both the identity of the user associated with the client device 150 and the method of authentication used by the client device 150 when its virtual local area network was instantiated.

At block 310, the authentication application 110 fulfills this request. The authentication application 110 checks its records and uses the virtual local area network tag to find the name of the user associated with the client device 150 as well as the method or first level of authentication used by the client device 150. The authentication application 110 sends this information in a second message back to the messaging component 122. The authentication application 110 at block 310 consults the policies database 136 to determine if a policy is in place regarding the accessibility of application 128 by the client device 150.

At block 312, the messaging component 122 provides the information received from the authentication application 110 to the application component 124. The application component 124 may be able to determine on its own that the user identification and authentication method are or are not adequate to permit access to the application 128. The application component 124 may alternatively work with the verification component 126 and the verification database 140 to make this determination. In the method 300, at block 312 it is determined that the method or first level of authentication used by the client device 150 is not adequate for the application 128 to provide access to the client device 150. In an example, the client device 150 may have used a password for its first level of authentication and the application 128 may prescribe that client devices 150 provide a digitally signed certificate to receive access. This information is passed to the messaging component 122 and the messaging component 122 notifies the client device 150 that it has been denied access to the application 128. The messaging component 122 may also advise the client device 150 that it may reattempt access to the application 128 by providing a different level of authentication. At block 314, the client device 150 severs its association with its virtual local area network At blocks 316 through 326, the client device 150 cycles back through the process described previously, this time after securing a second level of authentication. At block 316, the client device 150 attempts to start the application 128 and re-authenticates with the authenticator component 114 using a second and more secure credential to receive at block 318 a second or higher level of authentication. This process causes the virtual local area network with which the client device 150 was associated to be terminated and a new virtual local area network to be instantiated for the client device 150. This process may involve most or all of the actions described at block 202 of the method 200 and block 302 to be repeated including the generation of a second virtual local area network tag. At block 320, the messaging component 122 of the application server 120 recognizes the second virtual local area network tag associated with the client device 150.

At block 322 the application server 120 sends a third message to the authentication application 110 requesting the user identification associated with the client device 150 and requesting the second level of authentication associated with the second virtual local area network tag. At block 324, the authentication application 110 matches the second virtual local area network tag with the client device 150 and the second and higher level of authentication achieved by the client device 150 when it re-authenticated at block 318. The authentication application 110 sends this information in a fourth message back to the application server 120 including the second level of authentication.

At block 326, the application server 120 uses the user identification and the second level of authentication to attempt to access the application 128 as requested by the client device 150. The application 128 accepts the second level of authentication and permits access to the client device 150. At block 328, the client device 150 begins receiving access to the application 128. Whereas the first level of authentication was inadequate for access to the application 128 and the client device 150 was rejected, the second and higher level of authentication is adequate for the client device 150 to be permitted access to the application 128.

In an alternate embodiment to the method 300, the client device 150 may be able to access to the application 128 via association with only one specific virtual local area network. This may be a virtual local area network whose sole purpose is to provide access to the application 128 and wherein the virtual local area network may remain in existence independent of association with any client devices 150, 160. If the user of the client device 150 seeks access to the application 128, in this alternative embodiment access may be accomplished through association with only the one virtual local area network. The client device 150 would be unable to gain access to the application 128 through association with any other virtual local area network.

Figure 4:
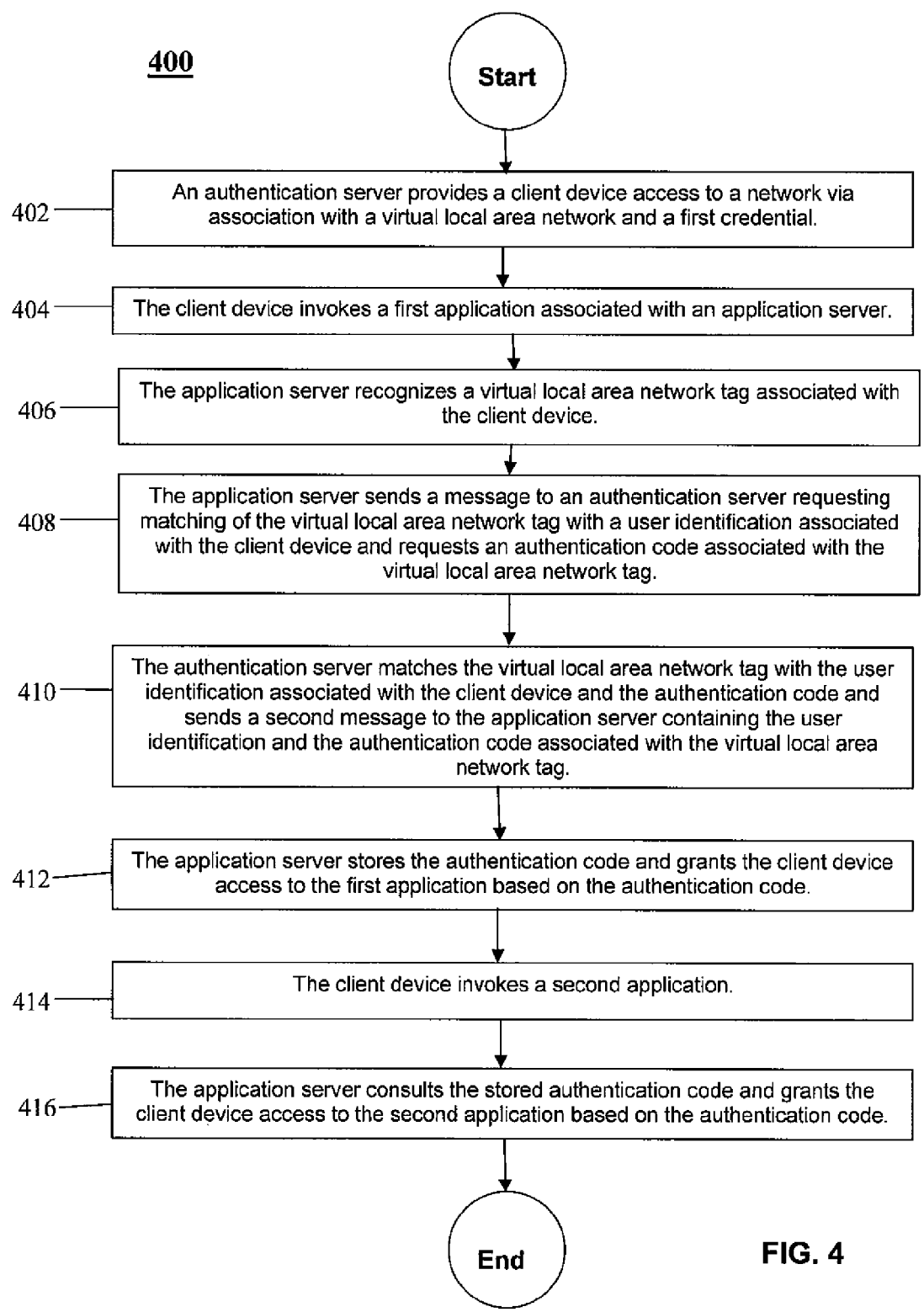
FIG. 4 is a flow chart illustrating another method according to an embodiment of the disclosure.

FIG. 4 discloses a processor-implemented method 400 for providing an application single sign on leveraging a virtual local area network identifier. The actions at blocks 402, 404, and 406 are substantially similar to the actions at blocks 202, 204, and 206 of the method 200 and blocks 302, 304, and 306 of the method 300. A client device 150 at block 402 is associated with a virtual local area network and at block 404 attempts to start a first application 128. These actions result in the application server 120 at block 406 recognizing that the virtual local area network tag associated with the client device 150 indicates that the client device 150 may be relieved of the tasks of signing in and authenticating with the application 128.

At block 408, the messaging component 122 of the application server 120 sends a first message to the authentication application 110 containing information about the virtual local area network tag. The first message requests the user identification associated with the client device 150 and requests the authentication code associated with the credentials supplied or methods of authentication used by the client device 150 when it was associated with its virtual local area network. The application server 120 intends to use to authentication code to determine the at least one application 128, 129 to which the client device 150 may be granted access while currently associated with its virtual local area network.

At block 410, the authentication application 110 links the virtual local area network tag received from the application server 120 with the user identification associated with the client device 150. The authentication application 110 also looks up the credential or combination of credentials provided earlier by the client device 150. The authentication application 110 may consult the authentication codes pool 138 of the configuration database 130 to determine the authentication code corresponding to the credential or combination of credentials provided by the client device 150. At block 410, the authentication application 110 sends a second message back to the application server 120 containing the requested user identification associated with the client device and authentication code associated with the credential or combination of credentials that together provide a composite level of authentication and may permit the client device access to at least one application 128, 129.

At block 412, the application server 120 receives the second message and stores the authentication code with the virtual local area network tag and the identity of the user associated with the client device 150. This information is stored for the duration of the current virtual local area network with which the client device 150 is associated. The verification component 126 of the application server 120 receives and uses the authentication code to enter the verification database 140 and determine which of the applications 128, 129, the client device 150 may currently access based on that authentication code. As the verification database 140 associates authentication codes with applications 128, 129 that may be accessed for each authentication code, the application server 120 may not contact the authentication application 110 again, if the client device 150 at a later time invokes a second application 129. At block 412, the application server 120 either permits or denies the client device 150 access to the first application 128 based on the results of the verification component 126 checking the verification database 140 as described.

At block 414, the client device 150 attempts to start a second application 129. This action is independent of when and whether the client device 150 was permitted or denied access to the first application 128 at block 412. At block 416, the verification component 126 again accesses the verification database 140 and finds the authentication code it stored earlier for the client device 150. The verification component 126 uses the authentication code to review the listing of applications 128, 129 that the client device 150 may be permitted to currently access. Based on its review of this listing in the verification database 140, the verification component 126 determines whether the client device 150 may be permitted or is denied access to the second application 129.

Figure 5:
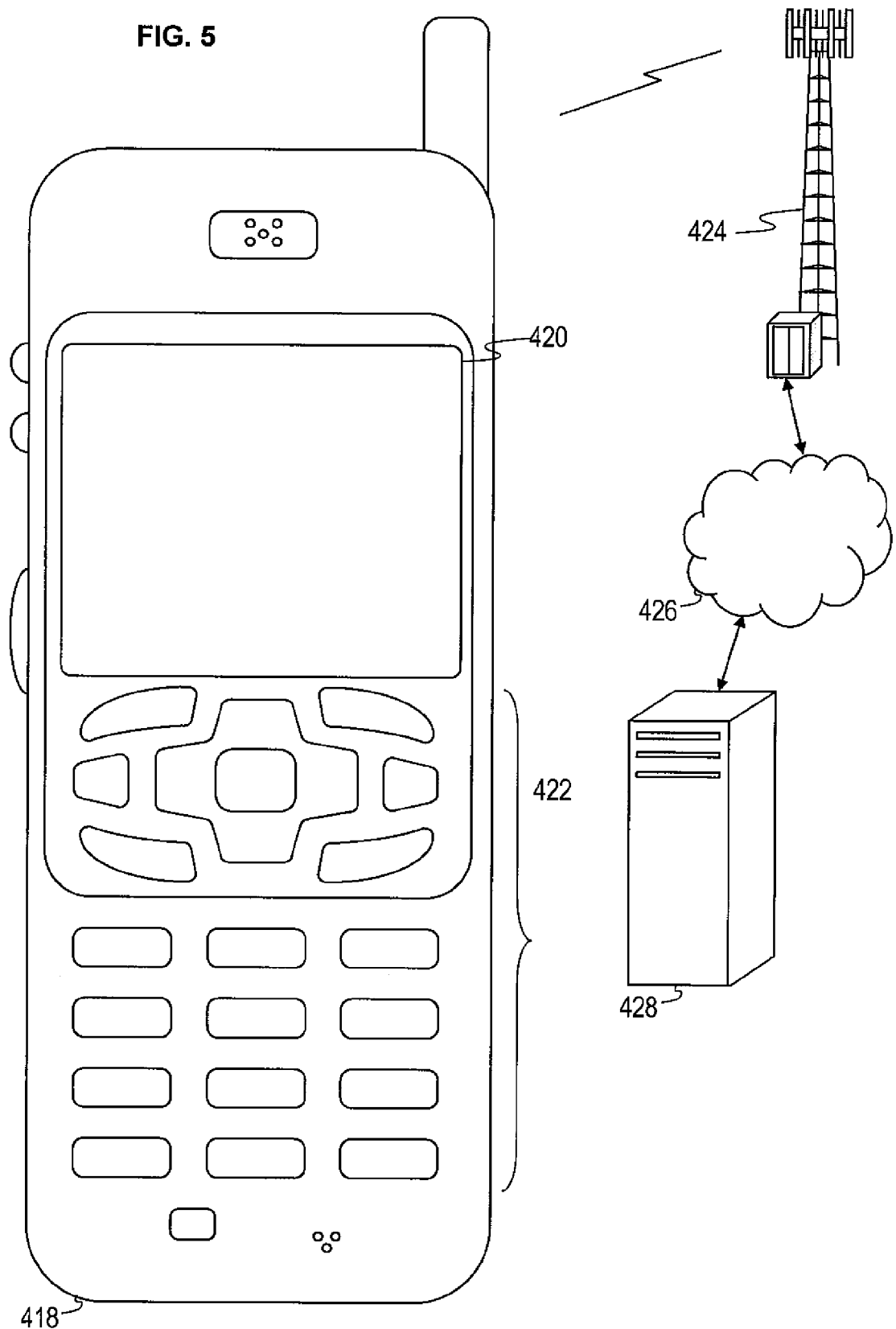
FIG. 5 is an illustration of a mobile device according to an embodiment of the disclosure.

FIG. 5 shows a wireless communications system including the mobile device 418. FIG. 5 depicts the mobile device 418, which is operable for implementing aspects of the present disclosure, but the present disclosure should not be limited to these implementations. Though illustrated as a mobile phone, the mobile device 418 may take various forms including a wireless handset, a pager, a personal digital assistant (PDA), a gaming device, an inventory control device, a media player, a digital camera, a digital calculator, a portable computer, a tablet computer, a laptop computer, and/or other. Many suitable handsets combine some or all of these functions. In some embodiments of the present disclosure, the mobile device 418 is not a general purpose computing device like a portable, laptop or tablet computer, but rather is a special-purpose communications device such as a mobile phone, wireless handset, pager, or PDA. The mobile device 418 may support specialized activities such as gaming, inventory control, job control, and/or task management functions, and so on.

The mobile device 418 includes a display 420 and a touch-sensitive surface or keys 422 for input by a user. The mobile device 418 may present options for the user to select, controls for the user to actuate, and/or cursors or other indicators for the user to direct. The mobile device 418 may further accept data entry from the user, including numbers to dial or various parameter values for configuring the operation of the handset. The mobile device 418 may further execute one or more software or firmware applications in response to user commands. These applications may configure the mobile device 418 to perform various customized functions in response to user interaction. Additionally, the mobile device 418 may be programmed and/or configured over-the-air, for example from a base transceiver station, a wireless access point, or a peer mobile device 418.

The mobile device 418 may execute a web browser application which enables the display 420 to show a web page. The web page may be obtained via wireless communications with a base transceiver station (BTS) 424, a wireless network access node, a peer mobile device 418 or any other wireless communications network or system. While a single base transceiver station 424 is illustrated, it is understood that the wireless communications system may comprise additional base transceiver stations. In some instances, the mobile device 418 may be in communications with multiple BTS's 424 at the same time. The BTS 424 (or wireless network access node) is coupled to a wired network 426, such as the Internet. Via the wireless link and the wired network, the mobile device 418 has access to information on various servers, such as a server 428. The server 428 may provide content that may be shown on the display 420. Alternately, the mobile device 418 may access the BTS 424 through a peer mobile device 418 acting as an intermediary, in a relay type or hop type of connection.

FIG. 6 shows a block diagram of the mobile device 418. While a variety of known components of handsets 418 are depicted, in an embodiment a subset of the listed components and/or additional components not listed may be included in the mobile device 418. The mobile device 418 includes a digital signal processor (DSP) 502 and a memory 504. As shown, the mobile device 418 may further include an antenna and front end unit 506, a radio frequency (RF) transceiver 508, an analog baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a charge-coupled device (CCD) camera 534, a camera controller 536, and a global positioning system (GPS) sensor 538. In an embodiment, the mobile device 418 may include another kind of display that does not provide a touch sensitive screen. In an embodiment, the DSP 502 may communicate directly with the memory 504 without passing through the input/output interface 518.

The DSP 502 or some other form of controller or central processing unit operates to control the various components of the mobile device 418 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The antenna and front end unit 506 may be provided to convert between wireless signals and electrical signals, enabling the mobile device 418 to send and receive information from a radio access network (RAN) or some other available wireless communications network or from a peer mobile device 418. In an embodiment, the antenna and front end unit 506 may include multiple antennas to support beam forming and/or multiple input multiple output (MIMO) operations. As is known to those skilled in the art, MIMO operations may provide spatial diversity which can be used to overcome difficult channel conditions and/or increase channel throughput. The antenna and front end unit 506 may include antenna tuning and/or impedance matching components, RF power amplifiers, and/or low noise amplifiers.

The RF transceiver 508 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 510 and/or the DSP 502 or other central processing unit. In some embodiments, the RF transceiver 426, portions of the antenna and front end 506, and the analog baseband processing unit 510 may be combined in one or more processing units and/or application specific integrated circuits (ASICs).

The analog baseband processing unit 510 may provide various analog processing of inputs and outputs, for example analog processing of inputs from the microphone 512 and the headset 516 and outputs to the earpiece 514 and the headset 516. To that end, the analog baseband processing unit 510 may have ports for connecting to the built-in microphone 512 and the earpiece speaker 514 that enable the mobile device 418 to be used as a mobile phone. The analog baseband processing unit 510 may further include a port for connecting to a headset or other hands-free microphone and speaker configuration. The analog baseband processing unit 510 may provide digital-to-analog conversion in one signal direction and analog-to-digital conversion in the opposing signal direction. In some embodiments, at least some of the functionality of the analog baseband processing unit 510 may be provided by digital processing components, for example by the DSP 502 or by other central processing units.

The DSP 502 may perform modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions associated with wireless communications. In an embodiment, for example in a code division multiple access (CDMA) technology application, for a transmitter function the DSP 502 may perform modulation, coding, interleaving, and spreading, and for a receiver function the DSP 502 may perform despreading, deinterleaving, decoding, and demodulation. In another embodiment, for example in an orthogonal frequency division multiplex access (OFDMA) technology application, for the transmitter function the DSP 502 may perform modulation, coding, interleaving, inverse fast Fourier transforming, and cyclic prefix appending, and for a receiver function the DSP 502 may perform cyclic prefix removal, fast Fourier transforming, deinterleaving, decoding, and demodulation. In other wireless technology applications, yet other signal processing functions and combinations of signal processing functions may be performed by the DSP 502.

The DSP 502 may communicate with a wireless network via the analog baseband processing unit 510. In some embodiments, the communications may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the mobile device 418 to function as a peripheral device to exchange information with a personal computer or other computer system. The infrared port 524 and other optional ports such as a Bluetooth interface or an IEEE 802.11 compliant wireless interface may enable the mobile device 418 to communicate wirelessly with other nearby handsets and/or wireless base stations.

The input/output interface 518 may further connect the DSP 502 to the vibrator 526 that, when triggered, causes the mobile device 418 to vibrate. The vibrator 526 may serve as a mechanism for silently alerting the user to any of various events such as an incoming call, a new text message, and an appointment reminder.

The keypad 528 couples to the DSP 502 via the interface 518 to provide one mechanism for the user to make selections, enter information, and otherwise provide input to the mobile device 418. Another input mechanism may be the touch screen LCD 530, which may also display text and/or graphics to the user. The touch screen LCD controller 532 couples the DSP 502 to the touch screen LCD 530.

The CCD camera 534 enables the mobile device 418 to take digital pictures. The DSP 502 communicates with the CCD camera 534 via the camera controller 536. The GPS sensor 538 is coupled to the DSP 502 to decode global positioning system signals, thereby enabling the mobile device 418 to determine its position. In another embodiment, a camera operating according to a technology other than charge coupled device cameras may be employed. Various other peripherals may also be included to provide additional functions, e.g., radio and television reception.

FIG. 7 illustrates a software environment 602 that may be implemented by the DSP 502. The DSP 502 executes operating system drivers 604 that provide a platform from which the rest of the software operates. The operating system drivers 604 provide drivers for the handset hardware with standardized interfaces that are accessible to application software. The operating system drivers 604 include application management services ("AMS") 606 that transfer control between applications running on the mobile device 418. Also shown in FIG. 7 are a web browser application 608, a media player application 610, and JAVA applets 612. The web browser application 608 configures the mobile device 418 to operate as a web browser, allowing a user to enter information into forms and select links to retrieve and view web pages. The media player application 610 configures the mobile device 418 to retrieve and play audio or audiovisual media. The JAVA applets 612 configure the mobile device 418 to provide games, utilities, and other functionality.

Figure 8:
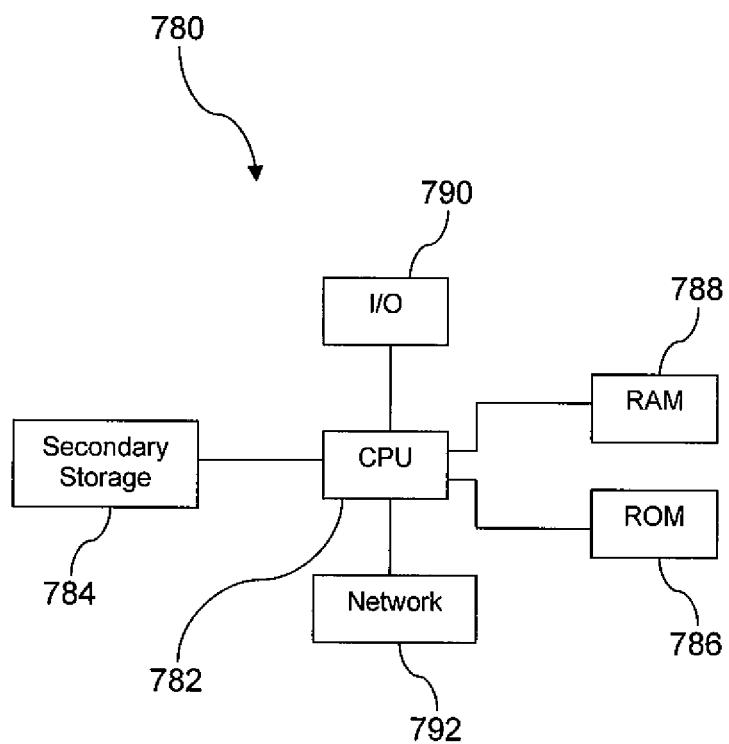
FIG. 8 illustrates an exemplary general purpose computer system suitable for implementing some aspects of the several embodiments of the disclosure.

Some aspects of the system described above may be implemented on any general-purpose computer with sufficient processing power, memory resources, and network throughput capability to handle the necessary workload placed upon it. FIG. 8 illustrates a typical, general-purpose computer system suitable for implementing one or more embodiments disclosed herein. The computer system 780 includes a processor 782 (which may be referred to as a central processor unit or CPU) that is in communications with memory devices including secondary storage 784, read only memory (ROM) 786, random access memory (RAM) 788, input/output (I/O) devices 790, and network connectivity devices 792. The processor may be implemented as one or more CPU chips.

The secondary storage 784 is typically comprised of one or more disk drives or tape drives and is used for non-volatile storage of data and as an over-flow data storage device if RAM 788 is not large enough to hold all working data. Secondary storage 784 may be used to store programs which are loaded into RAM 788 when such programs are selected for execution. The ROM 786 is used to store instructions and perhaps data which are read during program execution. ROM 786 is a non-volatile memory device which typically has a small memory capacity relative to the larger memory capacity of secondary storage. The RAM 788 is used to store volatile data and perhaps to store instructions. Access to both ROM 786 and RAM 788 is typically faster than to secondary storage 784.

I/O devices 790 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 792 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), and/or worldwide interoperability for microwave access (WiMAX) radio transceiver cards, and other well-known network devices. These network connectivity devices 792 may enable the processor 782 to communicate with an Internet or one or more intranets. With such a network connection, it is contemplated that the processor 782 might receive information from the network, or might output information to the network in the course of performing the above-described method steps. Such information, which is often represented as a sequence of instructions to be executed using processor 782, may be received from and outputted to the network, for example, in the form of a computer data signal embodied in a carrier wave Such information, which may include data or instructions to be executed using processor 782 for example, may be received from and outputted to the network, for example, in the form of a computer data baseband signal or signal embodied in a carrier wave. The baseband signal or signal embodied in the carrier wave generated by the network connectivity devices 792 may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 782 executes instructions, codes, computer programs, scripts which it accesses from hard disk, floppy disk, optical disk (these various disk based systems may all be considered secondary storage 784), ROM 786, RAM 788, or the network connectivity devices 792. While only one processor 782 is shown, multiple processors may be present. Thus, while instructions may be discussed as executed by a processor, the instructions may be executed simultaneously, serially, or otherwise executed by one or multiple processors.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A processor-implemented method for providing single sign-on leveraging a virtual local area network identifier, comprising:

providing, by an authentication server, a client device access to a network via association with a virtual local area network and a credential;

receiving, by an application server, a request that includes a virtual local area network tag from the client device to invoke an application in the virtual local area network hosted on the application server;

maintaining an association between the virtual local area network tag and the client device in one or more databases;

maintaining an association between the client device and a user identification in the one or more databases;

subsequently leveraging the virtual local area network tag included in the request from the client device to provide the client device access to the application without separately authenticating with the application, wherein the leveraging comprises:

identifying, by the application server, the virtual local area network tag associated with the client device included in the request from the client device;

sending, by the application server, a request message to the authentication server requesting the user identification associated with the client device based on the identified virtual local area network tag included in the request from the client device; and in response to receiving the request message, matching, by the authentication server, the identified virtual local area network tag included in the request from the client device with the user identification associated with the client device and maintained in the one or more databases and sending a reply message to the application server containing the user identification; and subsequently providing, by the application server, the client device with access to the application using the user identification contained in the reply message, wherein the providing comprises the application server promoting the application, which normally requests a unique user identification and a password or other credential, to rely on the virtual local area network tag and the user identification contained in the reply message and permit access to the client device.

2. The method of claim 1, further comprising dynamically configuring the virtual local area network, wherein the virtual local area network tag is provided upon instantiation of the virtual local area network tag.

3. The method of claim 1, wherein providing the client device access to the network further comprises instantiating, by the authentication server, the virtual local area network for exclusive association with the client device.

4. The method of claim 1, further comprising associating the virtual local area network with client devices used by individuals.

5. The method of claim 1, further including:
tearing down, by the authentication server, the virtual local area network; and
recovering, by the authentication server, the virtual local area network tag to a resource pool whereby the virtual local area network tag becomes available for future reuse.

6. The method of claim 1, further comprising providing, by the application server, the client device access to the application based on the user identification and a level of security associated with the credential.

7. The method of claim 1, further comprising accessing, by the authentication server, stored records associating the virtual local area network tag with the user identification associated with the client device in response to receiving the request message.

8. The method of claim 1, wherein the client device is one of a desktop computer, laptop computer, tablet computer, mobile telephone, media player, personal digital assistant (PDA), and portable electronic device.

9. A system that provides single sign-on leveraging a virtual local area network identifier, the system comprising:
an authentication server comprising a non-transitory memory and a processor, the authentication server configured to:
provide a client device access to a network via association with a virtual local area network and a credential,
one or more databases, wherein the one or more databases maintain an association between a virtual local area network tag and the client device and an association between the client device and a user identification, and
an application server comprising a non-transitory memory and a processor, the application server configured to:
receive a request that includes the virtual local area network tag from the client device to invoke an application in the virtual local area network hosted on the application server,
subsequently leverage the virtual local area network tag included in the request from the client device to provide the client device access to the application without separately authenticating with the application, wherein the leveraging comprises:
identify the virtual local area network tag included in the request from the client device,
send a request message to the authentication server requesting the user identification associated with the client device based on the identified virtual local area network tag included in the request from the client device, and
in response to receiving the request message, match the identified virtual local area network tag included in the request from the client device with the user identification associated with the client device and maintained in the one or more databases and send a reply message to the application server containing the user identification; and
subsequently provide the client device with access to the application using the user identification contained in the reply message, wherein the providing comprises the application server promoting the application, which normally requests a unique user identification and a password or other credential, to rely on the virtual local area network tag and the user identification contained in the reply message and permit access to the client device.

10. The system of claim 9, wherein the virtual local area network is dynamically configured and the virtual local area network tag is provided upon instantiation of the virtual local area network tag.

11. The system of claim 9, wherein the virtual local area network is associated with client devices used by individuals.

12. The system of claim 9, wherein the authentication server is further configured to:
tear down the virtual local area network; and
recover the virtual local area network tag to a resource pool whereby the virtual local area network tag becomes available for future reuse.

13. The system of claim 9, wherein the application server is configured to provide the client device access to the application based on the user identification and a level of security associated with the credential.

14. The system of claim 9, wherein the authentication server is further configured to access stored records associating the virtual local area network tag with the user identification associated with the client device in response to receiving the request message.

15. The system of claim 9, wherein the client device is one of a desktop computer, laptop computer, tablet computer, mobile telephone, media player, personal digital assistant (PDA), and portable electronic device.

* * * * *